US012056707B2

United States Patent
Muthuswamy et al.

(10) Patent No.: US 12,056,707 B2
(45) Date of Patent: Aug. 6, 2024

(54) APPLYING MACHINE LEARNING TO LEARN RELATIONSHIP WEIGHTAGE IN RISK NETWORKS

(71) Applicant: International Business Machines Corporation, Armonk, NY (US)

(72) Inventors: Srinivasan S. Muthuswamy, Bangalore (IN); Subhendu Das, Chapel Hill, NC (US); Carl Ottman, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 763 days.

(21) Appl. No.: 17/107,201

(22) Filed: Nov. 30, 2020

(65) Prior Publication Data

US 2022/0172211 A1    Jun. 2, 2022

(51) Int. Cl.
*G06Q 20/40*   (2012.01)
*G06F 16/908*  (2019.01)
*G06N 20/00*   (2019.01)
*G06Q 30/018*  (2023.01)

(52) U.S. Cl.
CPC ....... *G06Q 20/4016* (2013.01); *G06F 16/908* (2019.01); *G06N 20/00* (2019.01); *G06Q 30/0185* (2013.01)

(58) Field of Classification Search
CPC ............ G06Q 20/4016; G06Q 30/0185; G06F 16/908; G06F 16/288; G06F 16/9024; G06N 20/00; G06N 7/01
See application file for complete search history.

(56) References Cited

U.S. PATENT DOCUMENTS

| | | | |
|---|---|---|---|
| 8,674,993 B1 | 3/2014 | Fleming | |
| 10,437,840 B1* | 10/2019 | Poh | G06F 16/2477 |
| 10,542,032 B2 | 1/2020 | Madhu et al. | |
| 2002/0194119 A1* | 12/2002 | Wright | G06Q 20/10 |
| | | | 705/38 |
| 2008/0140576 A1* | 6/2008 | Lewis | G06Q 30/02 |
| | | | 707/999.107 |
| 2015/0178825 A1 | 6/2015 | Huerta et al. | |
| 2015/0278691 A1* | 10/2015 | Xia | G06F 16/951 |
| | | | 706/14 |
| 2018/0182029 A1 | 6/2018 | Vinay | |

(Continued)

*Primary Examiner* — Patrick McAtee
*Assistant Examiner* — Nakia Leffall-Allen
(74) *Attorney, Agent, or Firm* — Scully, Scott, Murphy & Presser, P.C.; Stosch Sabo

(57) ABSTRACT

A computer-implemented system, method and computer program product for detecting fraud. The system and method receives data representing transacting parties where a party transacts with another party to define a relationship therebetween. The received data is incorporated into a relationship network graph comprising nodes that capture data about transacting parties and corresponding information associated with each transaction. A risk model is run that is configured to determine a risk weight for the relation between nodes associated with the transacting parties based on the data captured in the relationship network graph. Then there is determined a degree of a party's association score based on risk scores of nodes associated with the party and a defined relationship with another suspicious party. The system then dynamically updates the risk weight of the relation based on the party's association score.

14 Claims, 5 Drawing Sheets

(56) References Cited

U.S. PATENT DOCUMENTS

| | | | |
|---|---|---|---|
| 2019/0095530 A1* | 3/2019 | Booker | G06F 16/9024 |
| 2019/0164172 A1 | 5/2019 | Ferranti et al. | |
| 2019/0311367 A1 | 10/2019 | Reddy et al. | |
| 2019/0347716 A1 | 11/2019 | Conrad et al. | |
| 2019/0377819 A1* | 12/2019 | Filliben | G06N 3/084 |
| 2020/0104576 A1* | 4/2020 | Usuki | G06V 20/30 |
| 2021/0042344 A1* | 2/2021 | Hu | G06N 3/08 |

* cited by examiner

APPLYING MACHINE LEARNING TO LEARN RELATIONSHIP WEIGHTAGE IN RISK NETWORKS

FIELD

The present application relates generally to financial fraud and risk assessment, and particularly to methods, computer system, and computer program products for creating a relationship network and using the relationship network to determine risk weights and perform risk-by-association analysis for detecting fraudulent activities involving entities such as individuals, financial institutions, corporations.

BACKGROUND

There is a regulatory need for monitoring financial transactions and activity of account holders at financial and insurance institutions to detect any fraudulent or criminal activity such as, for example, money laundering. Governmental anti-money laundering (AML) and other regulations may require a financial institution to monitor for activities and behavior indicative of criminal or fraudulent activity. Detecting financial activity indicative of fraudulent or criminal activity in increasingly difficult due to the involvement of a large amount of information, such as multiple financial transactions and large numbers of parties.

In fraud detection, one of the methods applied to compute risk is "risk by association". In the case of detecting fraudulent financial activity such as money laundering, there are different types of associations observed: 1) party-party via relation, 2) party-party via account ownership, and 3) party-party via transactions.

Currently fraud detection systems employ deterministic methods (e.g., Static weights based on domain rules) to compute the risk by association.

SUMMARY

A fraud detection system and method for detecting activity indicative of fraud, criminal behavior, and other suspicious activity indicative of risk.

A fraud detection system and method applying machine learning to determine the weights of the relationship of entities in a relationship graph and use propagation models to compute risk (i.e., risk by association) with increased accuracy.

A fraud detection system and method for applying machine learning to determine the weights of the relationship and propagate the weights to compute the entity's risk.

The fraud detection system and method includes a data processing system using a risk model to learn risk weights used to evaluate a party's risk by association.

According to an aspect, there is provided a method of detecting fraud. The method comprises: receiving, using a hardware processor, data representing transacting parties; incorporating, using the hardware processor, the received data into a relationship network comprising nodes that capture data about transacting parties and corresponding information associated with a transaction between the parties; running, using the hardware processor, a risk model configured to determine a risk weight for a relation between nodes associated with the transacting parties based on the data captured in the relationship network; determining, using the hardware processor, a suspicious party; determining, using the hardware processor, a party's association score based on a defined relationship with a node of the determined suspicious party; and dynamically updating, using the hardware processor, the risk weight of the relation between nodes based on the determined party's association score.

According to a further aspect, there is provided a computer-implemented fraud detection system. The system comprises: a memory storage device storing program instructions; and a hardware processor coupled to said memory storage device, the hardware processor running said program instructions to configure the hardware processor to: receive data representing transacting parties; incorporate the received data into a relationship network comprising nodes that capture data about transacting parties and corresponding information associated with a transaction between the parties; run a risk model configured to determine a risk weight for a relation between nodes associated with the transacting parties based on the data captured in the relationship network; determine a suspicious party; determine a party's association score based on a defined relationship with a node of the determined suspicious party; and dynamically update the risk weight of the relation between nodes based on the determined party's association score.

In a further aspect, there is provided a computer program product for performing operations. The computer program product includes a storage medium readable by a processing circuit and storing instructions run by the processing circuit for running a method. The method is the same as listed above.

DETAILED DESCRIPTION

As used herein, the term "risk weight" or "weight" represents the relation risk value between two parties (or a risk value assigned to an edge connecting two nodes in a relationship graph). A risk "seed weight" or "seed score" is an initial assigned to the relation, e.g., based on domain rules. A "risk score" is a calculated risk at the party level by looking the network of connected objects, i.e., by looking at the party's relationship graph network, the risk score is computed at the party level. A "association score" is one type of risk score.

Figure 1:
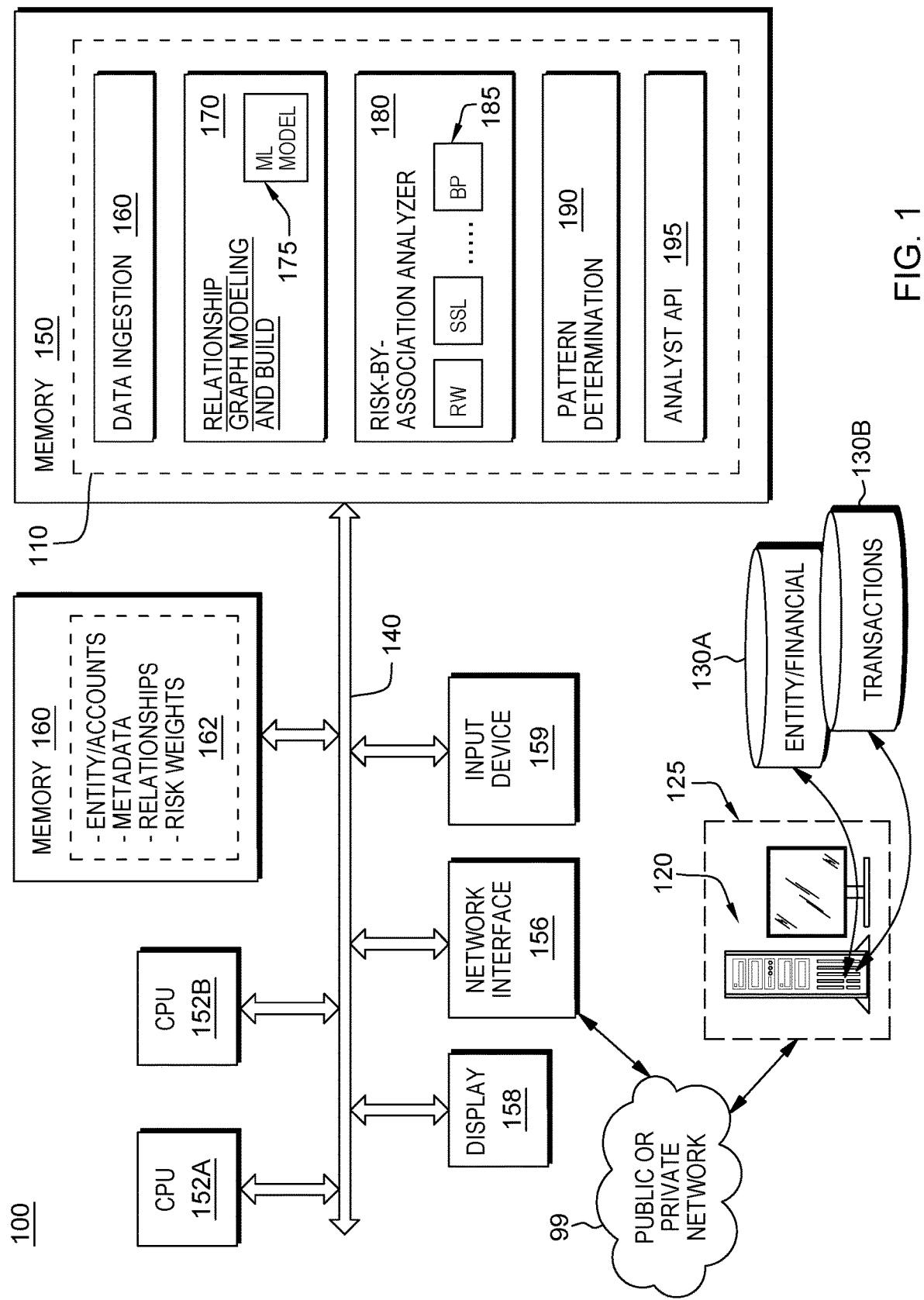
FIG. 1 schematically shows an exemplary computer system/computing device which is applicable to implement the embodiments of the financial fraud and risk assessment tool of the present invention.

FIG. 1 illustrates a computer system functioning as a risk assessment tool 100 implementing methods to more accurately detect fraud in the domain of financial services and related industries, e.g., insurance fraud/insurance claim fraud and money laundering fraud detection. In embodiments, such a system tool 100 may be employed by or for a bank (who may issue), or a regulatory authority (who may receive), a suspicious activity report (SAR) concerning a particular party or organization. The SAR may be issued by a bank for people (entities or parties) who have been found suspicious, i.e., the bank has found suspicious activity on a given party according to a regulation and reports this to the concerned authorities. In insurance fraud, a "suspicious" entity may be a doctor or a claimant or any party who may be placed on a "watch" list. In embodiments, any indicator besides a SAR or watchlist which represents a "known risk" associated with the party can be leveraged.

In the context of detecting financial fraud, e.g., money laundering, according to one embodiment, risk assessment tool 100 is a computer system, a computing device, a mobile device, or a server. In some aspects, computing device 100 may include, for example, personal computers, laptops, tablets, smart devices, smart phones, or any other similar computing device.

Computing system 100 includes one or more hardware processors 152A, 152B, a memory 150, e.g., for storing an operating system, application program interfaces (APIs) and program instructions, a network interface 156, a display device 158, an input device 159, and any other features common to a computing device. In some aspects, computing system 100 may, for example, be any computing device that is configured to communicate with one or more web-sites 125 including a web- or cloud-based server 120 over a public or private communications network 99. For instance, a web-site may include a financial institution that records/stores information, e.g., multiple financial transactions occurring between numerous parties (entities) and electronic transactions. Such electronic transactions may be stored in a database 130A with associated financial and entity information stored in related database 130B.

Further, as shown as part of system 100, there is provided a local memory useful for the graph relationship modeling framework processing which may include an attached memory storage device 160, or a remote memory storage device, e.g., a database, accessible via a remote network connection for input to the system 100.

In the embodiment depicted in FIG. 1, processors 152A, 152B may include, for example, a microcontroller, Field Programmable Gate Array (FPGA), or any other processor that is configured to perform various operations. Additionally shown are the communication channels 140, e.g., wired connections such as data bus lines, address bus lines, Input/Output (I/O) data lines, video bus, expansion busses, etc., for routing signals between the various components of system 100. Processors 152A, 152B are configured to execute method instructions as described below. These instructions may be stored, for example, as programmed modules in a further associated memory storage device 150.

Memory 150 may include, for example, non-transitory computer readable media in the form of volatile memory, such as random access memory (RAM) and/or cache memory or others. Memory 150 may include, for example, other removable/non-removable, volatile/non-volatile storage media. By way of non-limiting examples only, memory 150 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 156 is configured to transmit and receive data or information to and from a web-site server 120, e.g., via wired or wireless connections. For example, network interface 156 may utilize wireless technologies and communication protocols such as Bluetooth®, WIFI (e.g., 802.11a/b/g/n), cellular networks (e.g., CDMA, GSM, M2M, and 3G/4G/4G LTE, 5G), near-field communications systems, satellite communications, via a local area network (LAN), via a wide area network (WAN), or any other form of communication that allows computing device 100 to transmit information to or receive information from the server 120.

Display 158 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 158 may include a liquid crystal display (LCD), an e-paper/e-ink display, an organic LED (OLED) display, or other similar display technologies. In some aspects, display 158 may be touch-sensitive and may also function as an input device.

Input device 159 may include, for example, a keyboard, a mouse, a touch-sensitive display, a keypad, a microphone, or other similar input devices or any other input devices that may be used alone or together to provide a user with the capability to interact with the computing device 100.

With respect to configuring the computer system as a risk assessment tool 100 for detecting financial fraud, the local or remote memory 160 may be configured for storing information, e.g., nodes and relationships data 162 captured in the built relational network graph, including node data, e.g., entity/accounts/properties data; relationships data, e.g., entity relationships/functions and directionality, and associated meta-data, and computed risk weights/relationship weights. The nodes and relationships data, probabilistic weights data, and received metadata 162 is stored as a database and accessed for building the relational network graph model and for conducting analysis of the built relational network graph for use in detecting fraud. Such captured data can include but is not limited to: parties, accounts, transactions and associated metadata obtained from transactions information stored in the electronic databases 130A, 130B. Alternately or in addition, the entity data, entity relationships and meta-data 162 can be stored in a separate local memory storage device attached to the computer system 100.

As mentioned, memory 150 of computer system 100 further stores processing modules that include programmed instructions adapted to perform risk assessment as it relates to detecting financial fraud, e.g., money laundering.

In one embodiment, one of the programmed processing modules stored at the associated memory 150 include a data ingestion module 160 that provide instructions and logic for operating circuitry to access/read large amounts of data (e.g., parties, accounts, transactions data) for use by other modules that process the data to form and output a relationship graph network or data graph network.

In an embodiment, a relationship graph modeling and build module 170 provides instructions and logic for operating circuitry to form/build the relationship network graph for use in detecting suspicious activity typically associated with fraud, money laundering, and/or criminal activity. Graph build module 170 receives the ingested data and loads the data into the graph. In an embodiment, the module maps input data to objects and relations in the graph. For example, the input data transaction.csv may have originator_account and beneficiary_account and this input data can be mapped as a "transaction" relation between two given accounts in the relationship graph. The ingestion module would load the received input data as a relation between accounts. The relationship graph modeling and build module 170 determines from the parties, accounts and transactions data whether to model the data as a node, a property or a label.

Figure 4:
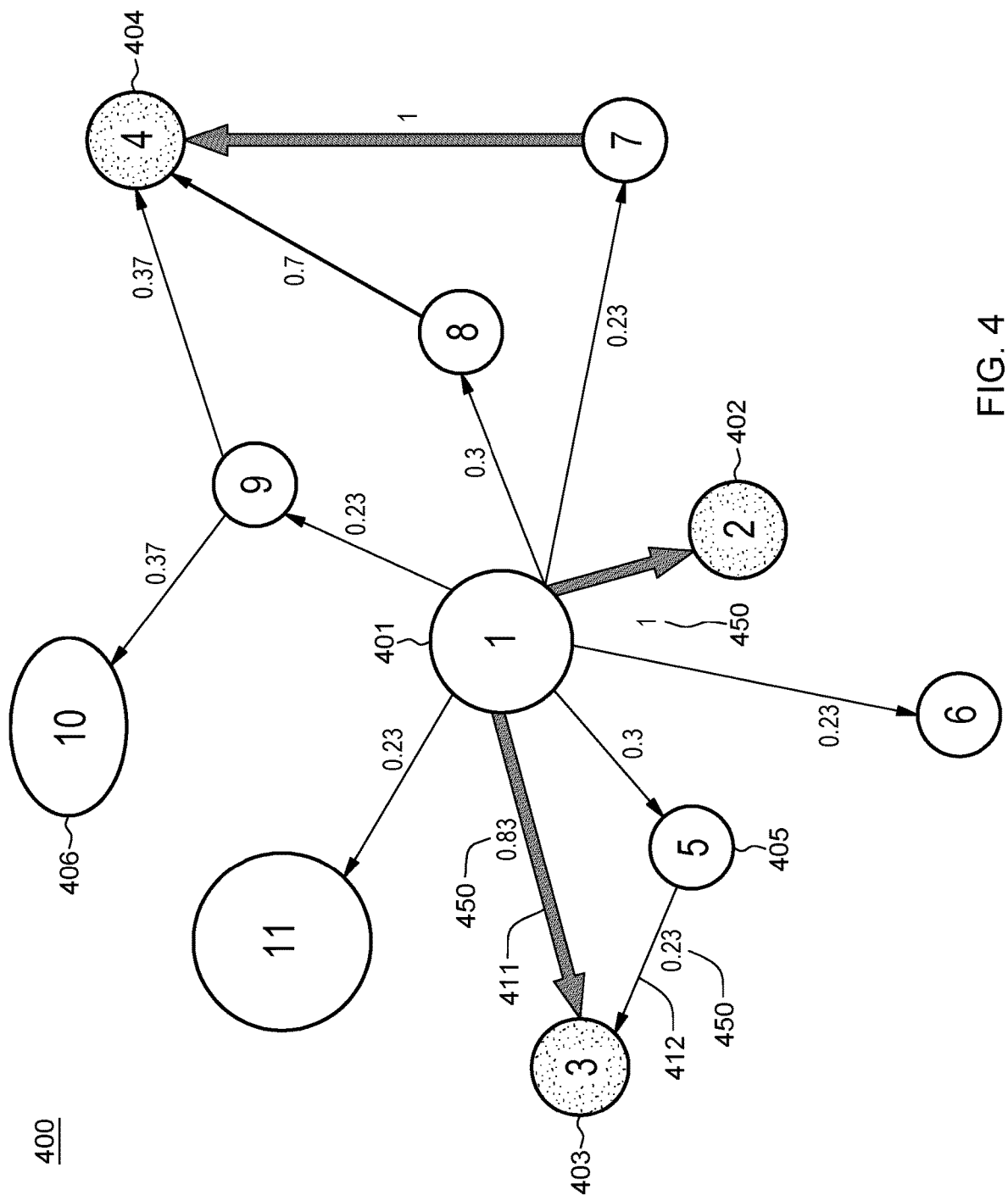
FIG. 4 illustrates a portion of an example relationship network or transactional network, also referred to as a network graph, built to model transaction data.

For example, FIG. 4 shows a portion of an example relationship network or transactional network, also referred to as a network graph 400, built to model data using graph modeling and build module 170. Network graph 400 is generated for expressing semantics of variables for use in detecting financial fraud. Variables can be indicated in the graph as a label that indicates a Boolean existence (e.g., presence or absence) of a category, a property value or as separate nodes. In FIG. 4, each modeled graph node, e.g., nodes 401, 403 can represent a variable (e.g., an object (e.g., a noun) such as a person, a business, a policy, an agency, a broker, a physician, a bank account, an address) having properties, e.g., key/value pairs. Nodes can be represented by a label, e.g., a location such as a city. Relationships connect or link nodes and can represent actions (e.g., verbs). For example, nodes 401, 403 are interconnected by relationship edge or connector 411, while nodes 403, 405 are interconnected by edge or connector 412. The transactional or relationship network from processing input data of a financial institution could include, for example, party-account relationships, account-account transactional relationships, and party-party relationships. Interconnecting edges can also have properties, e.g., represented as name/value pairs, and are directional.

In an aspect, a relationship is a functional mapping of one node to another node and has a domain (an entity it's coming from) and a range (the entity it's going to). In examples, relationship edges or connectors 411, 412 are modeled in the graph to express one or more of: a "has a" relationship expressing a part/whole relationship or composition (e.g., entity has one or more "accounts", a mailing "address" or business "phone number"); an "is a" relationship expressing an inheritance relationship; a "functional" relationship; or a "transitive" relationship, e.g., a node entity "is related to" another entity.

As an example, a relationship 412 can represent a transaction, e.g., bank transfer or a flow of money between a first account (node 405) to second account (node 403). A relationship can also be between two parties that share the same address, or share the same telephone number. The edge or link relationship 412 can be created to include metadata and properties such as: a transfer/transaction identifier, a type of currency, a bank name, a time of the transaction, etc.

In an embodiment, to assert properties about relationships among nodes, graph modeling and build module 170 can additionally place meta-data on it. In an example, a type of metadata placed upon a relationship (edge or connector) can include a "path" metadata, indicating a relationship property such as a weight or a distance. Another type of metadata placed upon a relationship is an "administrative" metadata, indicating for example, when the relationship was created, updated, who created the relationship. Metadata can also include a "version" integer to enable versioning of the particular relationship and can be used to determine the strength of the relationship. Such additional data added to the graph provides an additional nuance in detecting for different types of fraudulent activities being modeled.

Returning to FIG. 1, module 170 can further run a probabilistic risk model 175 to determine a fraud risk probability of the relation between any two given parties based on the variables or features and metadata captured in the relationship network graph. This can be attributed by the relation metadata or by the party metadata, e.g., if Party A is a risk party, it is going to be computed if the Party B is also suspicious based on the weight value of the relationship between the Party A and Party B. For example, the higher the weight, the greater the risk. In embodiments, the weight is determined using a probabilistic model which looks at the metadata as features and the analyst input as a ground truth label. That is, module 170 can further invoke supervised (or unsupervised) machine learning techniques for detecting fraud as known in the art, e.g., supervised learning using a regression model to predict a value of input data (classification) and unsupervised learning (clustering) techniques. Based on features and metadata relating to a party that are captured in the directed relationship network graph, techniques employing Hidden Markov Models or Artificial Neural Networks may alternatively or additionally be employed to compute a risk associated with the particular party and relationship with another party. Initially, a risk "seed" weight or seed score is assigned to the relation based on domain rules. The result of the machine learning is the computing of a fraud risk "weight" attributed to the relation between the two parties. In embodiments, there are thresholds applied to decide if a resulting "new" weight can be used to update the existing weight.

Another programmed processing module stored at the associated memory 150 of system tool 100 include a Risk-by-Association analyzer 180 employing logic and instructions for performing upon the built relationship graph network database data a Risk-by-Association analysis to make assumptions about associations found in the graph data. For example, in the context of financial fraud detection, the Risk-by-Association analysis performed by module 180 is used to establish a "guilt" or "suspicion" of an entity based on "associations" or "patterns" in the data (e.g., transaction interaction partner(s) of a suspicious entity, or entities that share functions). Such analysis methods can employ one or more risk-by-association machine learned methods 185: Random Walk with Restarts (RW), Semi-Supervised Learning (SSL), and Belief Propagation (BP), as known in the art. Such risk-by-association method(s) 185 results in computing a risk-by-association score.

Based on the computed Risk-by-Association analysis score, an analyst can provide feedback as to a potential risk levels of a particular relation between two parties/nodes. Based on the feedback, the probabilistic model is re-run to compute the revised weight of that relationship and the corresponding fraud risk weight is updated in the network graph.

In one embodiment, another processing module stored at the associated computer memory 150 includes a pattern determination module 190 employing logic and instructions for detecting any data patterns indicative of activity or behavior in the transaction network. In an example, the "risk-by-association" is an example pattern which can be presented to an analyst for review. The feedback received for the "pattern" can be used in the probabilistic model to compute the "revised" weights. The pattern detection module 190 receives the node/relationship data from the relationship graph, and processes the data to detect any known type of data patterns indicative of suspicious activity or behavior that the system 100 can search for and detect in the relationship network or graph 400. The pattern detection module 190 reads data from the network or graph 400 and detects patterns of behavior or activity in the relationship network as defined by an input configuration selected and input by the user. The pattern detection module 190 implements logic to program circuitry to receive input configuration data, receive relationship network data, process the input configuration and the relationship network data to detect data patterns relating to fraudulent activity, and in one or more embodiments create insights, including in an aspect aggregating and applying the insights to the relationship network 400.

Figure 2:
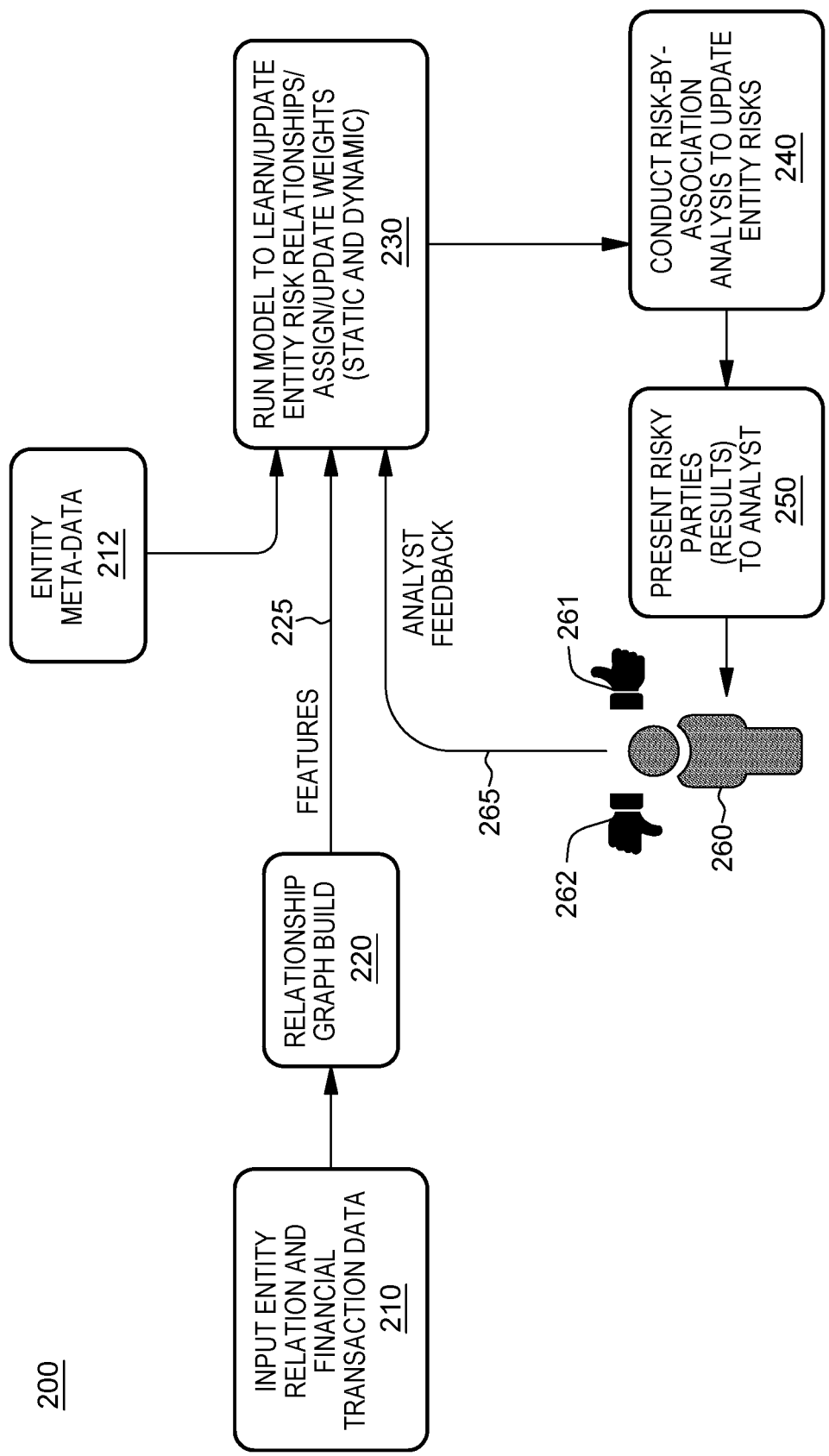
FIG. 2 depicts an overview of an iterative method run by supervisory program to automatically implement the financial risk detecting tasks employing machine learning in the risk detection system tool of FIG. 1.

As further shown, memory 150 includes a supervisory program 110 having instructions for configuring the computing system 100 to call each of the program modules and invoke the fraud detection operations of the risk assessment tool 100 described herein with respect to FIG. 2. In an embodiment, such supervisory program 110 calls methods and provides application program interfaces for building and updating the relationship network graph and running the fraud detection pattern detection and risk-by-association tasks run by the program modules for detecting fraud using the data captured in the relationship network graph. At least one application program interface 195 is invoked to receive input data from an "analyst", a domain expert trained in finance/financial matters particularly in the context of detecting financial fraud. Via API 195, the analyst receives detected "patterns", e.g., "risk-by-association" pattern and relationship risk scores between parties and provides feedback information to either escalate or close the investigation of a particular party depending on the associated risk relationships. In an embodiment, the analyst provides feedback information used to establish (statically based on domain rules and dynamically based on probabilistic weight from the trained model) or verify weights indicating risk of fraud of entities (parties) under investigation by the system.

FIG. 2 depicts a block diagram of an embodiment of a method 200 run by supervisory program 110 for processing data, including creating a relationship network, determining risk of parties based on risk-by-association methods and employing machine learning, and propagating determined risks within the relationship network for use in detecting fraudulent financial activity in the risk detection system tool of FIG. 1.

In FIG. 2, in the financial risk detection method 200, there is performed at 210 the receipt of data used in building the relationship network graph. This data is received from data ingestion module 160 and can include data such as the entities involved in a/the transaction(s) (i.e., a person, party, bank, an account(s)) and corresponding properties, e.g., a type of transaction (e.g., a deposit, a transfer), an amount transacted, a type of currency, locations, addresses, identifiers, etc.

For example, where a financial institution, such as for example a bank, desires to determine if there is a money laundering scheme or other fraud, for example as a result of governmental oversight, or regulations, such as for example anti-money laundering (AML) laws, the input data 210 can comprise: the transactions occurring with or being processed by the financial institution; the parties to any financial transaction with or through the financial institution; and account information (the customers) of the financial institution. In the case of an insurance organization and the like, the input data 210 can comprise: the parties doing business with the insurance organization; the claims made with the insurance organization; policy information (the customers) of the insurance organization, the identity of any agencies or brokers that were involved in underwriting the policy, vehicle objects, and any parties involved in treating the claim, e.g., auto body shop fixing the motor vehicle, bodily injury objects, physician treating patient, etc. The examples above are not limiting and there can be other situations where the system will have application, and additional or other input data can be provided.

At 220, the relationship graph build module 170 is then invoked in order to build the relationship graph, such as the example portion 400 of the relationship graph shown in FIG. 4.

In an embodiment, at 220, FIG. 2, data features, e.g., variables and objects (properties and key/value pairs) of nodes or connectors of the built relationship graph, can be labeled with the metadata. In an example embodiment, the metadata 212 is captured when the system ingests the data and can include, for example, the geographic location of the transacting party, the industry of the party, an activity index, a value to the bank, a transaction time, a version, a phone number, an address, familial relationship, social security number, associated with details of the entity and/or transaction to increase precision. This enables the relationship network graph dataset to include other labeled fraud/non-fraud items, to provide additional nuance when determining different types of fraudulent activities using the relationship network graph.

In an embodiment, the built relationship graph of FIG. 4 is a directed graph and, in an embodiment, includes data stored as an ordered pair G=(V, E), where V is a set whose elements are vertices or nodes and E is a set of ordered pairs of vertices, arrows, directed edges (a corresponding set named E), directed arcs or lines. The data stored for directed graph 400 can be collected over a period of time, e.g., months or years, and capture millions of transactions for thousands of parties. For example this graph memorializes all of the semantics of each of the variables of received transaction data, i.e., the nodes representing a variable, e.g., an object such as a person, a business, a policy, an agency, a broker, a physician, a bank account, an address, and any associated properties, e.g., key/value pairs such as a name and value or an account type; and any connectors connecting or linking nodes that represent the action, e.g., transfer, deposit, and any associated properties or values, e.g., transferred amounts, or shared values (phone numbers, addresses etc.). As shown in FIG. 4, the graph platform shows a party represented at node 401 is sending money to party represented at node 401 as captured by a directed relationship connector (edge) 411, and party represented at node 405 is also sending money to party represented at node 403 as captured by directed relationship connector (edge) 412. Data for node 403 (and similarly for nodes 402, 404) is recorded with a particular property, e.g., a flag or label indicating a SAR has been issued for that party, i.e., that it is a suspicious party and a greater fraud risk.

At block 230, in an embodiment, the system tool can run the supervised model, e.g., a probabilistic model, to establish/learn/update a fraud risk weight (statically and dynamically) applied to the relation between two parties or any two given objects or nodes. That is, based on the graph features data 225, including input meta-data 212, a particular risk fraud of a relation between interacting entities is predicted. Default edge connector relationship risk weight values may also be initially assigned based on domain rules.

Returning to FIG. 4, in an embodiment, the risk relationship score or "weight" 450 is assessed based on a relationship between parties, e.g., between parties, e.g., between parties 401 and 402, parties 401 and 403, parties 401 and 405, and between parties 403 and 405, etc. Alternatively, or in addition, the assigned or computed "weight" can be applied on the relation between two accounts or applied on any relation between two given nodes/objects in the graph.

In an embodiment, the method includes initially assigning a risk relationship score or "weight" 450 based on domain knowledge or simply by assigning a weight initially to default value of "1". For example, the weight or risk relationship score 450 between parties at nodes 401 and 402 is equal to "1". As shown in FIG. 4, the weight or risk relationship score 450 between parties at nodes 401 and 403 is equal to 0.83 while that between nodes 403 and 405 is 0.2. In an embodiment, a relationship score or weight 450 is determined by statistical methods such as by computing a "Recency, Frequency, Monetary value" (RFM) metric. In the RFM analysis, the metrics representing how recently the two parties last transacted, how often they transact, and the average monetary value of their transactions are used to determine the risk relationship score. A relationship between two parties detected by their sharing a telephone number or an address (directly or indirectly) may have a relationship score or weight of 0.5 or 0.75. Generally, the greater the computed relationship score 450, the stronger the relationship.

Continuing at block 240, FIG. 2, the system tool further conducts a Risk-by-Association analysis to update entity risks, and particularly, update the risk relationship score between entities (nodes). That is, in view of FIG. 4, it is possible that entities interacting with the parties at nodes 402, 403, 404 (having a SAR flag property assigned) can be (or are) suspicious. In an example, such an association of an entity with a known risky (i.e., suspicious) party may likely indicate a greater degree of likelihood of risk-by-association. The running of the machine learning model(s) at step 230 based on the variables or features 225 captured in the relationship network graph and the additional input of metadata, thus influences the degree of risk by association and the risk relationship score. The greater the computed risk relationship score, the stronger the relationship.

As an example if entity 403 operates a casino and has an SAR flag property, and interacting entity 401 is in the jewelry business, there may be a greater case for suspicion (higher fraud risk relationship) than if interacting entity 401 is in the information technology business interacting with party 403.

In an embodiment, the detection of metadata influencing the degree of risk-by-association can be via another machine learning model. In FIG. 4, for example, nodes 402, 403 are known risks due to reasons such as: 1. being subjected to sanctions/being on a watchlist; 2. PEP (politically exposed party); 3. SAR (suspicious activity reported). These reasons become attributes (i.e., metadata) on the "suspicious" parties in the relationship network graph.

In an embodiment, the method includes adjusting the risk association weights based on user input. For example, if it is determined by the risk-by-association analysis that a party (or parties) under investigation for transacting with a party who is flagged with an SAR has a high risk relationship weight, an alert may be generated by the system tool for an analyst to further investigate. Responsive to the alert, as shown in FIG. 2, at 250, an analyst or domain expert 260 is presented, via a user interface device, with a listing of the top risk parties, e.g., N potential high risk parties as a result of their relationships as found in the most recent risk-by-association analysis performed at 240. Depending upon the context of the case/parties being investigated, additionally provided to the analyst is a reason(s) why the particular transaction being alerted is determined as a potential fraud or why the particular transaction is suspicious based on the association.

Then, at 260, the analyst or domain expert 260 can review the alert and provide feedback 265 for input back into the model which feedback is used to dynamically adjust the risk relationship scores or weights to give certain relations a higher weightage (higher risk relationship) as compared to the other relations. For example, the analyst can look at metadata of the party (e.g., industry, geography, value to the interacting entity, sharing an address, etc.) to determine whether the transaction increases or contributes to the risk (is fraudulent) in which case a positive feedback 261 is provided to increase a fraud risk weight assessment or increase the risk weight of the entity, or whether it does not contribute to the risk assessment in which case a negative feedback 262 is provided to indicate a false positive or to take no further action with regard to the fraud risk weight assessment of the entity. That is, based on the different dynamics of the parties interaction, the feedback 265 provided by analyst 260 is able to make the risk assessment system tool 100 learn the type of relations that can contribute to a party's fraud risk and thereby train/update the model 175 at 230. Based on this analyst feedback 265 as an input, the system can learn/update weights in a dynamic way.

For example, if two parties are sharing same address (with a similarity metric applied to determine just how similar are their addresses) then if the risk relationship score is 0.9 then the assigned weight can be 0.9. The method of the tool 100 thus determines whether the weight of 0.9 is correct if two people share same address in the context of the risk-by-association. The system at 250 reports the top N parties who are having higher "risk by association" as potential suspicious people, and the analyst 260 reviews the case of the party or entities under investigation and decides whether it is really a risk or close the case if it is a false positive.

Based on received analyst feedback 265 on the risk network, the additionally captured meta-data associated 212 with the parties and the relationship network graph features 225, the system tool 100 machine learning model 175 updated at 230 to learn the weights and output for a given relationship the weights (scores). The system tool 100 thus learns the meta-data that influence the degree of risk by association (e.g., a party carrying a SAR flag in gold/diamond business may have high risk than in an industry such as IT) which assists in assigning/adjusting the risk score for each type of parties (node weights).

Thus, returning to 230, FIG. 2, responsive to the analyst's feedback data 265, or as new input data concerning the parties is received/ingested in the system and added to the relationship graph, the system performs a training of the supervised model 175. That is, once the data is labeled, the next iteration is to apply this new labeled dataset to train the supervised model that will be detecting fraudulent transactions in production use.

As an illustrative example, at 230, when new data comes in, the new data is added to the relationship graphs. Initially, if the model is not trained, static risk weights of the party may be assigned based on domain rules, otherwise, the weights are probabilistic, i.e., the trained model generates/outputs probabilistic weights of the parties. In the example, the model at 230 can receive the following: 1) entity meta data of the party A, e.g., node 403 having a flagged SAR property and 2) entity meta data of the party B, e.g., node 401; 3) their current assigned risk scores (weights); and 4) analyst feedback label, e.g., "true/false" from the analyst who, at 250, is presented with an indication of the suspicious parties and the reasons such as by the risk-by-association analysis results. Based on the current assigned weight and the metadata on the relation between party A and party B, the model will generate an output which are the revised weights.

As a further example, the probabilistic model 175 of the system tool can learn a specific rule whether certain types of sharing between parties results in a greater degree of risk relationship. For example, the system can learn whether a party sharing a social security number (SSN) shares more risk compared to a party sharing an address. For example, the system can learn a risk p(A→B) vs. a risk p(P→Q) where A is suspicious given A sharing SSN with party B vs. P is suspicious given party P is sharing an address with party Q. If sixty out of a hundred times an analyst determines that the p(A→B) where A shares an SSN with non-risky party B results in a positive (true) indication of fraud for a particular transaction type, the model learns or assigns at the edge between these parties a relationship risk weight value of 0.6. However, if one hundred out of one hundred instances an analyst determines that p(P→Q) where P shares an address with non-risky party Q, results in a positive (true) indication of fraud for a particular transaction type, the model learns or assigns at the edge between these parties a relationship risk weight value of 1.0. Subsequently, in future transactions among parties, it can be determined that a kind of relationship where a suspicious party shares an address with non-suspicious party of parties may more likely result in a greater or stronger risk relationship weight as compared to parties sharing a same SSN.

As a further example, the probabilistic model 175 of the system tool can learn a specific rule whether certain types of party-party relation via address is important (i.e., a higher risk relationship value) or whether a party-party relation via account ownership vs. transactions is important (i.e., a higher risk relationship value) as against a simple RFM. For example, a party sending $10,000 to a tax haven is determined higher risk than a party sending $100,000 to another business party.

In an embodiment, the system tool 100, in the risk-by-association network analysis, can apply a "damping factor" in determining a potential risk weight of a party. For example, in view of FIG. 4, given a node with a known risk, nodes 402, 403, 404 are in the one hop neighborhood of node 401 and nodes 404, 406 are within the second hop neighborhood of node 401. Thus, for parties at a particular degree of separation, e.g., at $2^{nd}$ hop/$3^{rd}$ hop levels away in the relationship network graph, from a first node associated with a high-risk party, there may be applied a damping factor in the determining of a risk of that separate party (node). In an embodiment, the damping factor reduces the risk of a separated party. That is, defining "damping factor" as the distance (or degree of separation) increase between two parties A and B, then associated risk also reduced as the degree of separation increases. For example, if a damping factor is set as 0.8, then for every hop, it functions to reduce a risk of the separated party by 20%. As an example, a relation between two suspicious parties can be assigned a risk (seed) score or weight of a value equal to 1. For example, given a network graph having parties transacting as connected by A→B→C (i.e., party A is connected to party B and party B is connected to party C), in this example, party B and party C are connected with suspicious party A. Party B is connected with degree of separation 1 and party C is connected with A with the degree of separation 2. Thus, given an assumption that the weights are 1.0, then in this example, relation between party A and party B is assigned the value 1.0 as its risk (seed) score. Subsequently, if party B is found suspicious and party B propagates the risk to party C, then in this scenario, the same weight is not assigned but rather the system applies the damping factor. So instead of the relation between party B and party C being assigned a seed score of value 1.0, it is assigned a risk seed score computed according to 0.8×1.0=0.8 as its associated risk score.

However, it is the case that certain party metadata can cause a higher risk at a party a $2^{nd}$ hop away or indirect connection (e.g., a third hop) away. For example, a politically exposed party might not have higher risk in the $2^{nd}$ hop vs. a party subject to sanctions.

Figure 3:
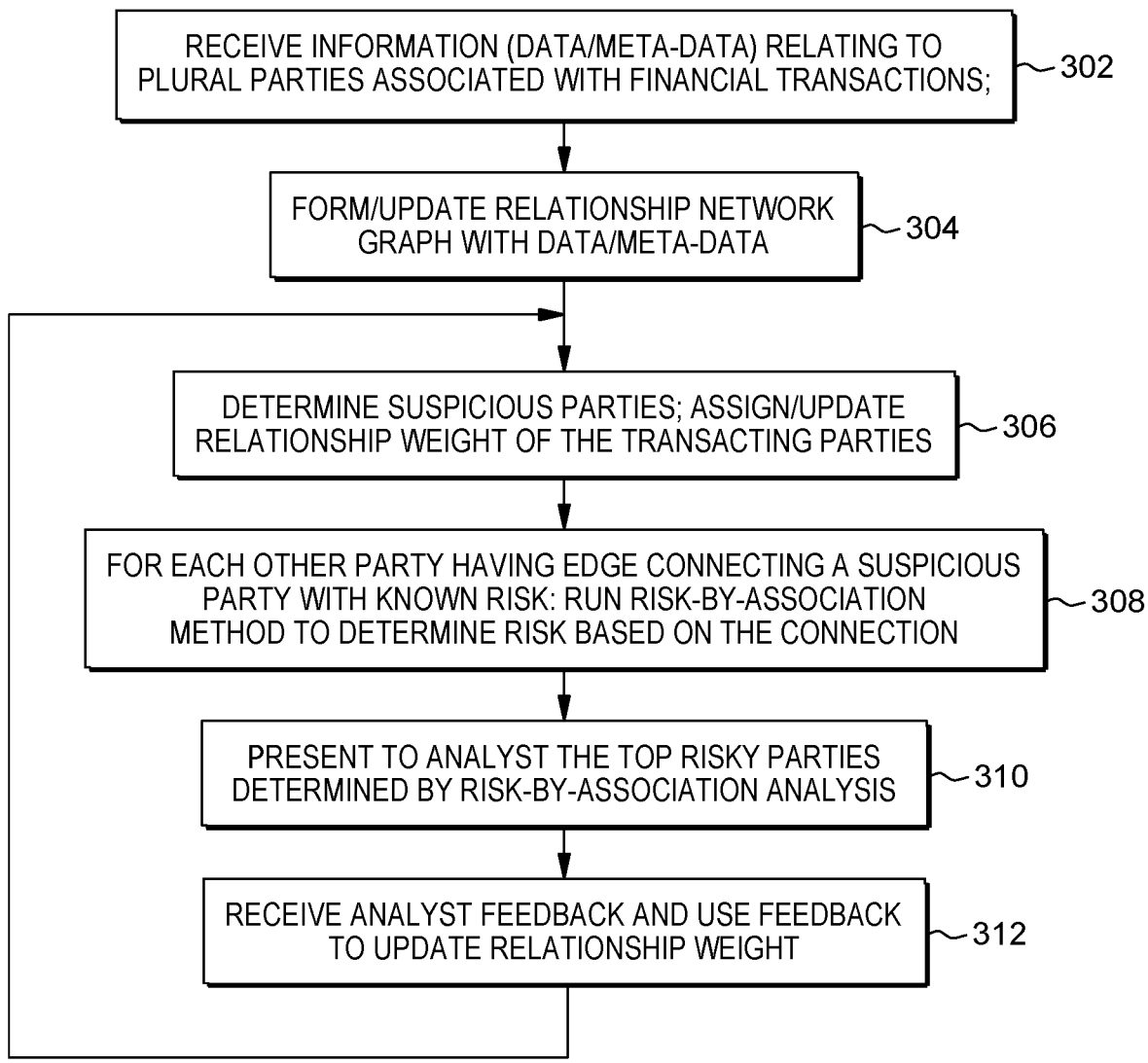
FIG. 3 illustrates an exemplary method of a supervisory program run for determining fraudulent activity using a relationship network graph and employing machine learning to dynamically determine and propagate node and edge risk weight using the system tool of FIG. 1.

FIG. 3 illustrates an exemplary method 300 of a supervisory program run for determining fraudulent activity using a relationship network graph and employing machine learning to dynamically determine and propagate node and edge risk weight using the system tool of FIG. 1.

As shown in FIG. 3, at 302, there is continually or periodically input to the system the transaction data relating to a particular party, e.g., a bank or insurance company. The data received relates to details concerning transactions among parties interacting the bank or insurance company. In embodiments, the input data includes meta-data relating to plural parties associated with financial transactions.

Then, at 304, FIG. 3, using techniques known in the art, this input data is ingested and possibly subject to data normalization in order to be best integrated within a built relationship network graph. That is, a data ingestion module (not shown) can be implemented to read input data and create a graph which, in one or more embodiments, is a large scale relationship network. The data ingestion module includes circuitry and logic to receive the input data and process the data to output graph or network. The data input can include but is not limited to: objects such as accounts, parties, account to accounts relationships, party-to-party relationships. The method forms a directional graph that captures all of the relationships among the parties and their accounts.

The, at 306, FIG. 3, the system determines a suspicious party and assigns or updates a risk seed score (weight) between the transacting parties/nodes. In an embodiment, a relationship between a suspicious party and another is statically assigned a seed score or weight (e.g., using domain rules). Alternatively, risk seed scores/weights are dynamically generated, e.g., by running a machine-learned probabilistic model. In this embodiment, the machine-learned model generated risk weight scores are dynamically determined based on several factors. One of the factors can include the party's meta-data or property labels (e.g., a SAR flag, political affiliation, or other known risk factor), the number of hops away from a known suspicious party or damping factor, the results of a risk-by-association analysis and an analyst's feedback data. As an example, if input metadata indicate a party has been labeled with a SAR flag, it is considered a high risk party and the relation may be assigned a greater risk weight.

Then, at 308, FIG. 3, the system conducts the risk-by-association analysis by running an appropriate model or algorithm and determining a risk by association score of a party based on an association with the suspicious party, e.g., connection can be via party-party, party-account-party or party-account-account-party or party-claim-party, etc. This connection is an edge (connector) between two objects (i.e., between two nodes). In particular, for each other party having an edge connecting a suspicious party with known risk, the system runs a risk-by-association method or other pattern indicating a risk relation based on the connection to determine the risk by association score at the party level.

At this point an alert may be generated if a party/parties are determined suspicious based on their relationships as determined by the risk-by-association analysis. For example, the system may set or receive a threshold risk value that, if exceeded by a party's change in risk score, triggers a response by an alert generator that the risk factor threshold has been exceeded. That is, if a risk score that is calculated at the party level by looking at the network of connected object is above a certain pre-defined threshold, the system triggers an alert which can be received by the analyst or concerned authority.

In response to a generated alert, or alternatively, even if an alert is not generated, at 310, the system presents to an analyst or domain expert, the top N parties that are deemed suspicious based on their association(s). The system additionally presents to the analyst the respective reasons for the determination of the high risk association of the parties (nodes). For example, based on the metadata received, it may be determined that the party shares a same address or phone number with the known suspicious party.

Finally, at 312, FIG. 3, the analyst provides a feedback, e.g., a true or false determination, indicating that the reason for the high risk assessment of an associated relation between the parties/nodes is sound or correct (i.e., not a false positive). The method returns to 306, FIG. 3 to return the analyst's feedback to the machine-learned model for use in updating the risk weight of the relation between the parties/nodes.

Figure 5:
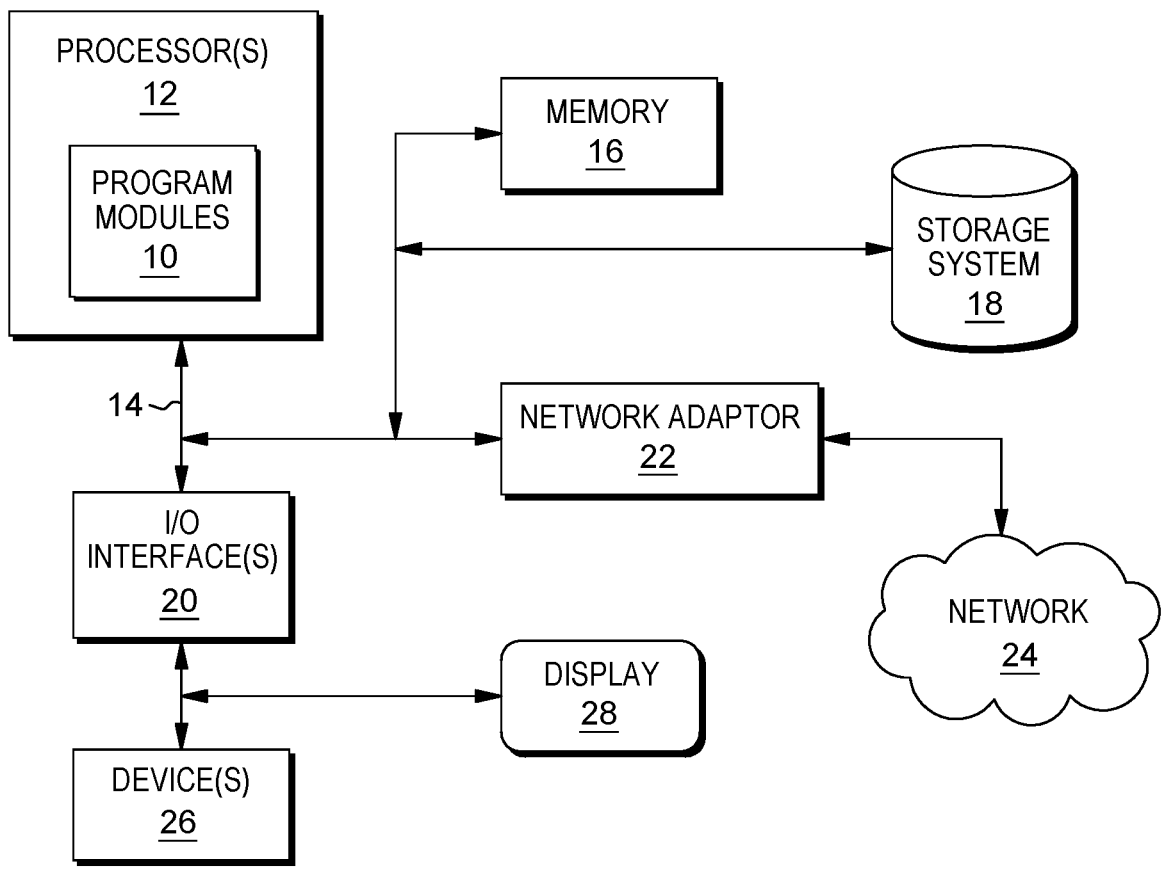
FIG. 5 illustrates yet another exemplary system in accordance with the present invention.

FIG. 5 illustrates an example computing system in accordance with the present invention. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the present invention (see e.g., FIG. 2).

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory an/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of detecting fraud comprising:
   receiving, using a hardware processor, data representing transacting parties;
   incorporating, using the hardware processor, the received data into a relationship network comprising nodes that capture data about transacting parties and corresponding information associated with a transaction between the parties;
   running, using the hardware processor, a risk model trained to learn types of relations between the transacting parties that can contribute to a party's fraud risk and to determine a risk weight for a relation between nodes associated with the transacting parties based on the data captured in the relationship network and input to said risk model, said captured data comprising metadata associated with the parties transaction that influence a degree of risk by association between the transacting parties, said captured data further comprising a damping factor relating to a degree of separation between parties represented by a number of node hop levels separating the nodes of the relationship network;
   determining, using the hardware processor, a suspicious party having a known risk weight in the relationship network;
   applying the damping factor for reducing a risk weight of a node in said relationship network based on the number of node hop levels between that node and a node of the suspicious party node having the known risk weight;
   determining, using the hardware processor, a transacting party's association score based on a defined relationship with the node of the determined suspicious party; and
   dynamically updating, using the hardware processor, the risk weight of the relation between nodes of the transacting parties based on the determined party's association score and the applied damping factor, wherein said dynamically updating comprises:
   obtaining, based on the captured metadata, a feedback information provided by a user, said feedback information used to establish or verify weights contributing to a risk of fraud of the transacting parties;
   updating said risk model using machine learning to correlate the obtained feedback and metadata that further influences the degree of risk by association and update node weights representing the parties and edge weights representing party's relationships of the risk model.

2. The computer-implemented method as claimed in claim 1, further comprising:
   determining, using the hardware processor, a relationship risk weight for an edge connecting a node associated with an object and a node representing another object in a relationship network graph, an object representing one of: a party's account with an entity, a party's claim with an entity.

3. The computer-implemented method as claimed in claim 2, further comprising:
   determining, using the hardware processor, one or more reasons supporting the determined risk relationship weight, said one or more reasons determined based on said information of said captured metadata, wherein said captured metadata further influences the party's association score.

4. The computer-implemented method as claimed in claim 3, further comprising:
   presenting to the user, via a user interface device, information corresponding to one or more transacting parties whose determined risk score exceeds a predetermined threshold, said presented information further comprising said one or more reasons supporting the determined risk relationship weight.

5. The computer-implemented method as claimed in claim 4, further comprising:
   receiving from the user, via the user interface device, a feedback information indicating a truth or falsity of the determined risk relationship weight between the transacting parties based on said one or more supporting reasons; and
   inputting said feedback information to said risk model for use in said dynamically updating a risk weight for the relation.

6. A computer-implemented fraud detection system comprising:
   a memory storage device storing program instructions; and
   a hardware processor coupled to said memory storage device, the hardware processor running said program instructions to configure the hardware processor to:
   receive data representing transacting parties;
   incorporate the received data into a relationship network comprising nodes that capture data about transacting parties and corresponding information associated with a transaction between the parties;
   run a risk model trained to learn types of relations between the transacting parties that can contribute to a party's fraud risk and to determine a risk weight for a relation between nodes associated with the transacting parties based on the data captured in the relationship network and input to said risk model, said captured data comprising metadata associated with the parties transaction that influence a degree of risk by association between the transacting parties, said captured data further comprising a damping factor relating to a degree of separation between parties represented by a number of node hop levels separating the nodes of the relationship network;
   determine a suspicious party having a known risk weight in the relationship network;
   apply the damping factor for reducing a risk weight of a node in said relationship network based on the number of node hop levels between that node and a node of the suspicious party node having the known risk weight;
   determine a party's association score based on a defined relationship with the node of the determined suspicious party; and
   dynamically update the risk weight of the relation between nodes based on the determined party's association score and the applied damping factor, wherein to dynamically update, the hardware processor is further configured to:
   obtain, based on the captured metadata, a feedback information provided by a user, said feedback information used to establish or verify weights contributing to a risk of fraud of the transacting parties;

update said risk model using machine learning to correlate the obtained feedback and metadata that further influences the degree of risk by association and update node weights representing the parties and edge weights representing party's relationships of the risk model.

7. The computer system as claimed in claim 6, wherein said hardware processor is further configured to:

determine a relationship risk weight for an edge connecting a node associated with an object and a node representing another object in a relationship network graph, an object representing one of: a party's account with an entity, a party's claim with an entity.

8. The system as claimed in claim 7, wherein said hardware processor is further configured to:

determine one or more reasons supporting the determined risk relationship weight, said one or more reasons determined based on said information of said captured metadata, wherein said captured metadata further influences the party's association score.

9. The system as claimed in claim 8, wherein said hardware processor is further configured to:

present to the user, via a user interface device, information corresponding to one or more transacting parties whose determined risk score exceeds a predetermined threshold, said presented information further comprising said one or more reasons supporting the determined risk relationship weight with the transacting party.

10. The system as claimed in claim 9, wherein said hardware processor is further configured to:

receive from the user, via the user interface device, a feedback information indicating a truth or falsity of the determined risk relationship weight between the transacting parties based on said one or more supporting reasons; and input said feedback information to said risk model for use in said dynamically updating a risk weight for the relation.

11. A non-transitory computer readable medium comprising instructions that, when executed by at least one hardware processor, configure the at least one hardware processor to:

receive data representing transacting parties;

incorporate the received data into a relationship network comprising nodes that capture data about transacting parties and corresponding information associated with a transaction between the parties;

run a risk model trained to learn types of relations between the transacting parties that can contribute to a party's fraud risk and to determine a risk weight for a relation between nodes associated with the transacting parties based on the data captured in the relationship network and input to said risk model, said captured data comprising metadata associated with the parties transaction that influence a degree of risk by association between the transacting parties, said captured data further comprising a damping factor relating to a degree of separation between parties represented by a number of node hop levels separating the nodes of the relationship network;

determine a suspicious party having a known risk weight in the relationship network;

apply the damping factor for reducing a risk weight of a node in said relationship network based on the number of node hop levels between that node and a node of the suspicious party node having the known risk weight;

determine a degree of a party's association score based on a defined relationship with the node of the determined suspicious party; and dynamically update the risk weight of the relation between nodes based on the determined party's association score and the applied damping factor, wherein to dynamically update, the at least one hardware processor is further configured to:

obtain, based on the captured metadata, a feedback information provided by a user, said feedback information used to establish or verify weights contributing to a risk of fraud of the transacting parties;

update said risk model using machine learning to correlate the obtained feedback and metadata that further influences the degree of risk by association and update node weights representing the parties and edge weights representing party's relationships of the risk model.

12. The non-transitory computer readable medium as claimed in claim 11, wherein said instructions further configure the at least one hardware processor to:

determine a relationship risk weight for an edge connecting a node associated with an object and a node representing another object in a relationship network graph, an object representing one of: a party's account with an entity, a party's claim with an entity.

13. The non-transitory computer readable medium as claimed in claim 12, wherein said instructions further configure the at least one hardware processor to:

determine one or more reasons supporting the determined risk relationship weight, said one or more reasons determined based on said information of said captured metadata, wherein said captured metadata further influences the party's association score.

14. The non-transitory computer readable medium as claimed in claim 13, wherein said instructions further configure the at least one hardware processor to:

present to the user, via a user interface device, information corresponding to one or more transacting parties whose determined risk score exceeds a predetermined threshold, said presented information further comprising said one or more reasons supporting the determined risk relationship weight with the transacting party;

receive from the user, via the user interface device, a feedback information indicating a truth or falsity of the determined risk relationship weight between the transacting parties based on said one or more supporting reasons; and input said feedback information to said risk model for use in said dynamically updating a risk weight for the relation.

* * * * *